(12) United States Patent
White

(10) Patent No.: US 10,083,467 B2
(45) Date of Patent: Sep. 25, 2018

(54) SYSTEM AND METHOD FOR COMMUNICATING INFORMATION TO A CUSTOMER AT A POINT-OF-SALE VIA A WIRELESS LINK WITHIN A RETAIL STORE

(75) Inventor: Lee White, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 1421 days.

(21) Appl. No.: 12/613,950

(22) Filed: Nov. 6, 2009

(65) Prior Publication Data
US 2011/0112898 A1 May 12, 2011

(51) Int. Cl.
*G06Q 30/02* (2012.01)
*G06Q 30/06* (2012.01)
*G06Q 20/20* (2012.01)

(52) U.S. Cl.
CPC ......... *G06Q 30/06* (2013.01); *G06Q 20/202* (2013.01); *G06Q 30/0238* (2013.01)

(58) Field of Classification Search
USPC ............ 705/14.38, 21; 235/462.01; 455/41.3
See application file for complete search history.

(56) References Cited

U.S. PATENT DOCUMENTS

| | | | |
|---|---|---|---|
| 6,687,346 B1 | 2/2004 | Swartz et al. | |
| 6,705,520 B1 * | 3/2004 | Pitroda et al. | 235/382.5 |
| 6,940,492 B2 * | 9/2005 | Maritzen et al. | 345/173 |
| 6,950,939 B2 * | 9/2005 | Tobin | 713/182 |
| 7,051,932 B2 * | 5/2006 | Fernandes et al. | 235/449 |
| 7,113,093 B2 * | 9/2006 | Fallin et al. | 340/572.1 |
| 7,213,742 B1 * | 5/2007 | Birch et al. | 235/375 |
| 7,308,254 B1 | 12/2007 | Rissanen | |
| 7,580,699 B1 * | 8/2009 | Shaw | G06Q 20/102 455/410 |
| 7,587,196 B2 * | 9/2009 | Hansen | 455/406 |
| 7,671,742 B2 * | 3/2010 | Fallin et al. | 340/572.1 |
| 7,770,786 B1 * | 8/2010 | Birch et al. | 235/379 |
| 7,970,669 B1 * | 6/2011 | Santos | 705/30 |
| 8,027,917 B2 * | 9/2011 | Easterly et al. | 705/39 |
| 2003/0004808 A1 | 1/2003 | Elhaoussine et al. | |
| 2003/0187794 A1 * | 10/2003 | Irwin et al. | 705/40 |

(Continued)

FOREIGN PATENT DOCUMENTS

| | | |
|---|---|---|
| CN | 1399216 A1 | 2/2003 |
| CN | 101466068 A | 6/2009 |

OTHER PUBLICATIONS

Borman et al.; "Concept for Trusted Personal Devices in a Mobile and Networked Environment"; European Commission (contract #507894) Feb. 7, 2006; FileName: Bormann06conceptPersTrustedDevice07feb2006.*

(Continued)

*Primary Examiner* — Eric R Netzloff
(74) *Attorney, Agent, or Firm* — McCarter & English, LLP; David R. Burns

(57) ABSTRACT

A system and method for providing a customer of a retailer with information during checkout may include pairing with a mobile device during checkout of a customer at a POS system. Prior to communicating data to the mobile device, permission may be received from the customer via the mobile device to allow for data to be communicated to the mobile device. The data may be communicated to the mobile device during checkout by the customer.

16 Claims, 5 Drawing Sheets

(56) References Cited

U.S. PATENT DOCUMENTS

| | | |
|---|---|---|
| 2006/0043175 A1* | 3/2006 | Fu et al. .................. 235/383 |
| 2006/0074769 A1 | 4/2006 | Looney et al. |
| 2006/0136546 A1* | 6/2006 | Trioano ............ G06Q 30/02 709/203 |
| 2007/0022058 A1 | 1/2007 | Labrou et al. |
| 2007/0050083 A1* | 3/2007 | Signorelli et al. ........... 700/241 |
| 2007/0108269 A1 | 5/2007 | Benco et al. |
| 2007/0241189 A1 | 10/2007 | Salvin et al. |
| 2008/0011837 A1 | 1/2008 | Wesley |
| 2008/0146151 A1* | 6/2008 | Lyu .................. H04B 17/318 455/41.2 |
| 2008/0176543 A1 | 7/2008 | Gravel et al. |
| 2008/0255942 A1* | 10/2008 | Craft ......................... 705/14 |
| 2009/0292599 A1* | 11/2009 | Rampell et al. ........... 705/14.13 |
| 2010/0094701 A1* | 4/2010 | Ghosh et al. ............. 705/14.36 |
| 2010/0115602 A1* | 5/2010 | Coppinger ......... H04L 63/0272 726/12 |
| 2010/0275267 A1* | 10/2010 | Walker et al. ................ 726/26 |
| 2011/0060636 A1* | 3/2011 | Grossman et al. ........ 705/14.25 |
| 2011/0066483 A1* | 3/2011 | Salmon et al. ........... 705/14.17 |
| 2011/0112898 A1* | 5/2011 | White ...................... 705/14.38 |
| 2012/0265623 A1* | 10/2012 | Zhu ...................... G06Q 30/06 705/16 |

OTHER PUBLICATIONS

International Search Report and Written Opinion date dated Jan. 11, 2011 for PCT Application No. PCT/US2010/055657.

Office Action dated Jun. 10, 2015 for Chinese patent application 201080054000A.

Office Action issued in related Canadian patent application No. 2,780,173 dated Nov. 2, 2016.

Office Action from related Canadian patent application No. 2,780,173 dated Oct. 23, 2017.

\* cited by examiner

SYSTEM AND METHOD FOR COMMUNICATING INFORMATION TO A CUSTOMER AT A POINT-OF-SALE VIA A WIRELESS LINK WITHIN A RETAIL STORE

BACKGROUND

Retail stores provide customer service in a variety of ways. One way that customer service is provided is at the checkout counter, where a point-of-sale (POS) is used to checkout products being purchased by customers. One way that customer service can be improved is to improve efficiency at the checkout counter to speed up the time that a customer waits for checking out and paying for his or her products being purchased. Another way that retailers can provide added customer service is to provide customers relevant information of products that the customers are purchasing, coupons for future purchases, or other information.

SUMMARY

To provide customers of a retailer with improved customer service, the principles of the present invention provide for enabling a point-of-sale (POS) to interact with a mobile device, such as a mobile telephone, of a customer to provide the customer with data or information when checking out and purchasing products. The information may be associated with products that the customer is purchasing. In one embodiment, the POS may interact with a mobile device of a customer using a wireless communications protocol, such as Bluetooth® communications protocol. To limit the number of hardware devices at the POS, a wireless scanner that exists at a POS and is configured with the Bluetooth® communications protocol may be used to interface using Bluetooth® technology or other wireless technology. The mobile device of the customer may have an application or applet loaded onto his or her mobile device to enable POS interaction with the mobile device. In one embodiment, the applet may require that the user accept a request by the POS to access or communicate with the mobile device. If the user accepts interaction from the POS, then the POS may communicate data to the mobile device for the user to receive and save on his or her wireless device. The data may include receipt of the purchase, coupons associated with items being purchased, information associated with items being purchased, warranty information, or any other information that may be associated with products being purchased by the customer. The applet may allow the user to access the information for later display, thereby enabling the customer to use coupons that may include a barcode for scanning by a POS at a later date, for example.

One embodiment of a system for providing a customer of a retailer with information during checkout may include a point-of-sale (POS) system at which the customer of the retailer purchases products. A wireless access point, such as a barcode scanner, may be in communication with the point-of-sale system and configured to operate as an access point for a mobile device of the customer to communicate with the point-of-sale system. The wireless access point may be configured to pair with the mobile device and, prior to communicating data to the mobile device, to receive permission from the customer via the mobile device to allow for data to be communicated to the mobile device from the POS system. The POS system may further be configured to communicate the data to the mobile device via the wireless access point during checkout by the customer.

One embodiment of a method for providing a customer of a retailer with information during checkout may include pairing with a mobile device during checkout of a customer at a POS system. Prior to communicating data to the mobile device, permission may be received from the customer via the mobile device to allow for data to be communicated to the mobile device. The data may be communicated to the mobile device during checkout by the customer.

One embodiment of a mobile device for communicating with a POS may include an electronic display configured to display data. An input/output (I/O) unit may be configured to communicate data to a communications network using a first communications protocol and to local devices via a second communications protocol, where the second communications protocol is a shorter range communications protocol than the first communications protocol. A processing unit may be in communication with the electronic display and I/O unit, and be configured to, in response to receiving a request to receiving a request from the POS to receiving data, prompt a user to allow or deny data from being communicated from the POS to the mobile device. The processing unit may further be configured to communicate a selected response to the prompt by the user to the POS to allow or deny data from being communicated from the POS to the mobile device.

BRIEF DESCRIPTION

DETAILED DESCRIPTION

Figures 1A, 1B:
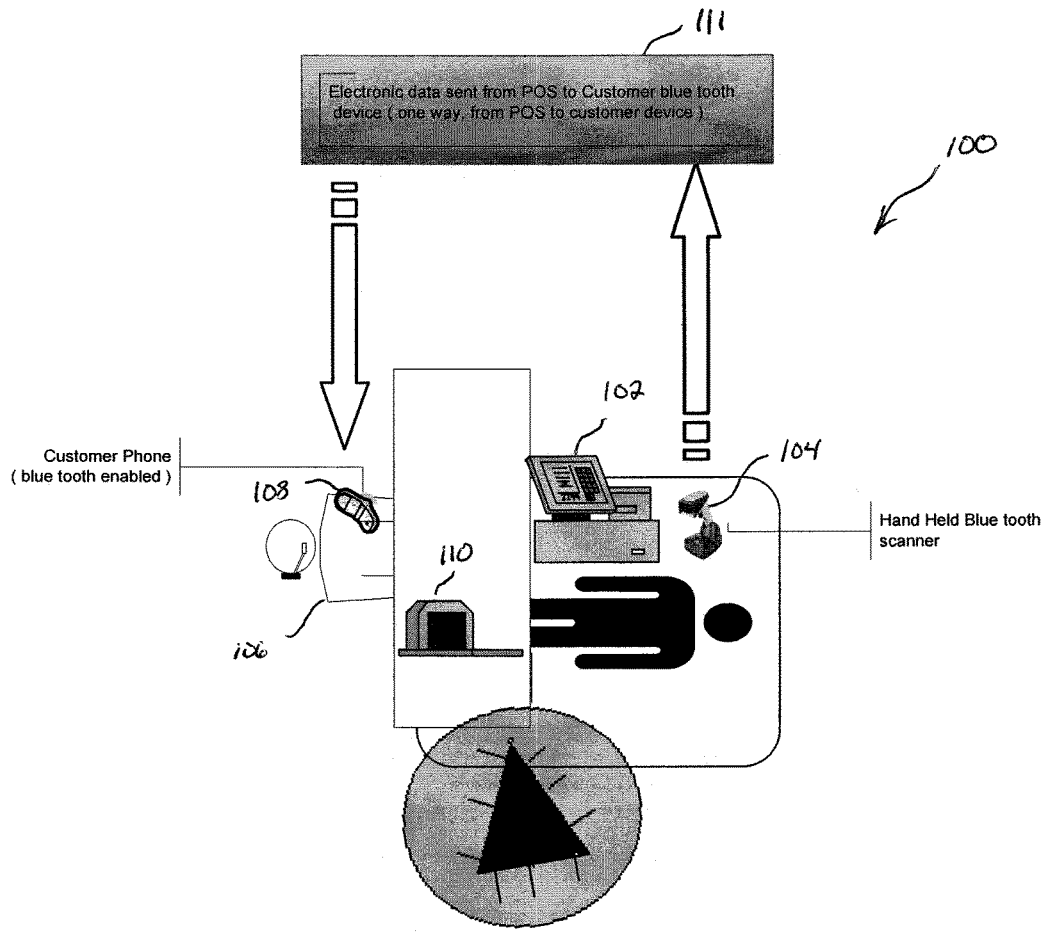
FIG. 1A is an illustration of an illustrative checkout counter at a retail store with a POS configured to communicate with a wireless device of a customer.
FIG. 1B is a screen shot of an illustrative user interface with which customers may interact while checking out of the retail store.

With regard to FIG. 1A, an illustration of an illustrative checkout counter at a retail store including a point-of-sale (POS) 102, such as a cash register, that is in communication with a scanner 104 for scanning barcodes is shown. In one embodiment, the scanner 104 is a hand-held scanner that may be wired or wirelessly in communication with the POS 102. In one embodiment, the scanner 104 may utilize the Bluetooth® communications protocol for communicating with the POS 102. Although shown as a traditional checkout counter at which an individual works, the principles of the present invention may be applied to an automated checkout counter at which a customer may scan products to be purchased. Other configurations of checkout counters are contemplated by the principles of the present invention.

A customer 106 that utilizes a mobile device 108, such as a mobile telephone, smart telephone, personal digital assistant (PDA), or other mobile device that is capable of communicating using a local communications protocol, such as the Bluetooth® communications protocol, may communicate with the POS 102 via the scanner 104. The scanner 104 may operate as a gateway device for the mobile device 108 to interface with the POS 102. As the mobile device 108 comes into range of the local or short range wireless communications protocol of the scanner 104, the scanner 104 and/or POS 102 may determine that a "discoverable" mobile device is within range of the scanner 104. If the mobile device is available and configured to receive data, data may be communicated from the POS 102 to the mobile device 108 via the scanner 104. In order for the mobile device 108 to be configured to receive data from the POS 102 via the scanner 104, an applet is to be loaded onto the mobile device 108 prior to becoming in range of the scanner 104. The applet or application may be downloaded to the mobile device via a network, such as the Internet or mobile telephone network (not shown), from a service provider or the retailer to enable the mobile device 108 to interact with the POS 102. As the mobile device 108 becomes in range of the scanner 104, the mobile device 108 and scanner 104 may automatically perform a pairing or synchronization process to open a communication channel between the two devices 104 and 108.

A user interface 110 may be in communication with the POS 102 that enables users to interact with the POS 102. The user interface 110 may allow the POS 102 to display items being purchased and price of each item in the same or similar manner as displayed on an electronic display of the POS 102. In addition, the user interface 110 may display a graphical user interface, such as that shown in FIG. 1B. In an alternative embodiment, the user interface 110 may also function as a financial card reader, as understood in the art.

With regard to FIG. 1B, a screen shot of an illustrative graphical user interface 112 is shown. The graphical user interface 112 may enable the customer to manage contact information, such as home address, mobile device telephone number, and email address. In addition, the graphical user interface 112 may display customer name, address, telephone number, email address, and any other contact information with which the POS 102 or other system of the retailer may use to communicate information to the customer. As shown, soft-buttons 114a-114d may be selected by the customer to update the address information. In addition, the graphical user interface 112 may include selectable soft-buttons 116a and 116b that allow the customer to subscribe to a newsletter or other information source produced by the retailer, and subscribe to a "My Mobile" option to allow the customer to receive wireless communication updates by the POS 102 or other system of the retailer. Still yet, the graphical user interface 112 may include an "initiate data xfer" soft-button 118a or "skip data xfer" soft-button 118b to allow the POS 102 to initiate pairing with the mobile device 108 of the customer or skip data transfer from the POS 102 with the mobile device 108, respectively. By providing the "initiate pairing" soft-button 118, the customer is provided added protection and control of communications with his or her mobile device 108, thereby allowing the customer to feel more secure when shopping in the retail store. The POS 102 may also be configured to skip data transfer with the mobile device 108 if the customer does not want to receive information on his or her mobile device 108 or initiate data transfer if the customer indicates that he or she would like data to be transferred.

Continuing with FIG. 1A, for simplicity purposes, customer interaction with the mobile device should be minimal, but the customer 106 should be able to manually accept or reject a communication from the POS 102 to the mobile device 108, as desired. Communications between the POS 102 and mobile device 108 may be performed over a wireless communications channel 111 using any communication protocol used by the mobile device 108 and POS 102. By allowing the customer 106 to accept or reject a communication, such as an electronic receipt, the customer 106 may maintain control over access to the mobile device. The application or applet that is executed on the mobile device 108 may be configurable by the customer 106 to require that he or she accept a communication from the POS 102 or automatically accept or deny a communication from the POS 102 by default. However, such a default option may not be as safe as requiring the customer to actively accept communications. Furthermore, the application being executed by the mobile device 108 may allow the customer the ability to manage data, such as receipts, coupons, or otherwise, that are received from the POS 102 for later access and display.

In addition to the POS 102 communicating with the mobile device 108 during checkout, the POS 102 may further be configured to broadcast information to mobile devices while not being used to perform a transaction (i.e., checkout products for a customer). In broadcasting messages, the POS 102 may communicate promotional messages, specials, notices, coupons, or any other information to customers that are within range of the POS 102. In one embodiment, the POS 102 may be configured to broadcast the information via the scanner 104 or a wireless modem (not shown) using Bluetooth® or another communications protocol, such as WiFi. Alternatively, the POS 102 may be configured to broadcast messages to mobile devices within broadcast range using WiFi, voice over Internet Protocol (VoIP), short message service (SMS), or any other communications protocol that mobile telephones are capable of receiving. The broadcast range may be 40 feet, for example.

Figure 2:
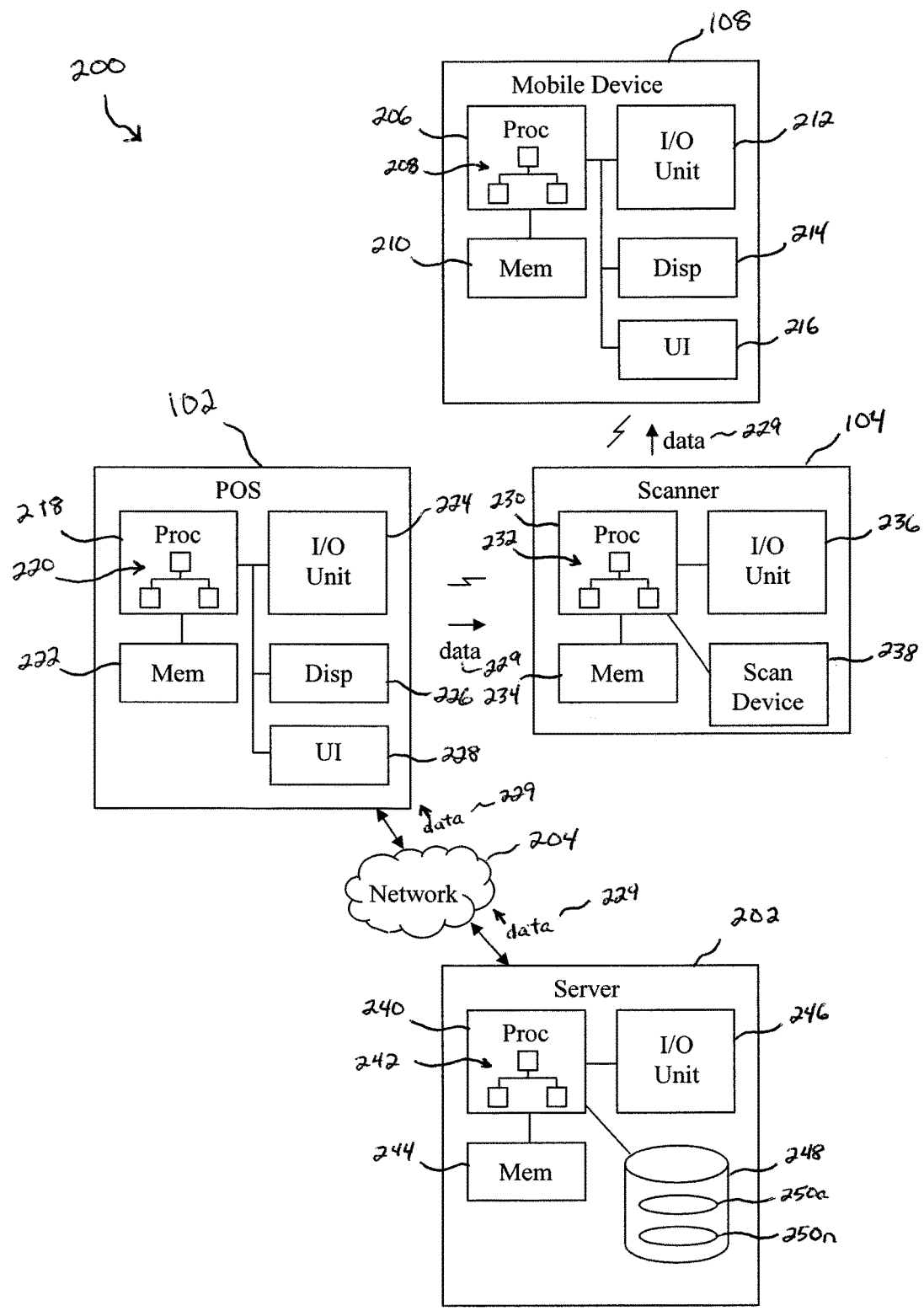
FIG. 2 is a block diagram of an illustrative network environment showing a mobile device in communication with a scanner at a POS.

With regard to FIG. 2, the POS 102, scanner 104, and mobile device 108 are shown to be in communication with one another. In addition, a server 202, which may be operated by a retailer at which the POS 102 is being used, may be in communication with the POS 102 via a network 204, such as a local network or wide area network, such as the Internet. The devices may communicate with one another using one or more communications protocol, as understood in the art. In one embodiment, to protect the retailer, the POS 102 may restrict data other than pairing and an approval response from a user of the mobile device from being accepted by the POS 102. In another embodiment, the POS 102 may be configured to allow for receiving data communications other than pairing and an approval response from the mobile device 108. Those data communications may include requests for recent purchases, shopping lists, coupon submissions, or any other communication that may assist a shopper with a current or future shopping trip, for example.

The mobile device 108 may include a processing unit 206 that executes software 208. The software 208 may include an application or applet that is downloaded from the retailer or other party for enabling the mobile device 108 to communicate with the POS 102 via scanner 104. The processing unit 206 may be in communication with a memory 210, I/O unit 212, display unit 214, and user interface (UI) 216. The memory 210 may be used to store data, such as data received from the POS 102 during a purchase transaction. The I/O unit 212 may be configured to communicate using a mobile communications protocol, as understood in the art, and a local wireless communications protocol, such as the Bluetooth communications protocol, as understood in the art.

The display 214 may be an electronic display that is or is not a touch screen display. The user interface 216 may include keys, buttons, computer mouse, or any other interface element that allows a user to interface with the software 208 that is being executed by the processing unit 206.

The scanner 104 may include a processing unit 230 that executes software 232. The processing unit 230 may be in communication with a memory 234, I/O unit 236, and scan device 238. The memory 234 may be configured to store data and software. The I/O unit 236 may be configured to communicate via a wired or wireless communications protocol, such as the Bluetooth® communications protocol, that allows for communication with the POS 102 and mobile device 108. The scan device 238 may be configured to scan barcodes or other product identifiers, as understood in the art. The software 232 may execute an application that allows the scanner 104 to synchronize or pair up with the mobile device 108.

The POS 102, which may be a cash register that allows for a customer to pay cash or use a financial card, such as a credit card or debit card, may include a processing unit 218 that executes software 220. The processing unit 218 may be in communication with a memory 222, I/O unit 224, display 226, and user interface 228. In one embodiment, the display 226 may include multiple displays, where one of the displays is for use by the retail store associate who is operating the POS 102 and another display is one with which the customer may interface during the checkout process (see FIG. 1, user interface 110). Although not shown, a financial card scanner may be in communication with the processing unit 218 of the POS 102 that enables customers to scan their financial cards (e.g., credit card) when making a purchase of products, as understood in the art. The software 220 may include software that allows for processing of financial transactions to enable users or shoppers to purchase goods from the retailer. In addition, the software 220 may include software that enables communications with the scanner 104 to receive scan data and information that identifies the mobile device 108, such as a telephone number or network identifier, to enable the POS 102 to identify a customer profile or other information associated with a customer with whom the mobile device 108 is associated. Furthermore, the processing unit 218 may execute software 220 that is able to collect information of products that are being purchased by the customer and communicate data 229 to the mobile device 108 via the scanner 104.

The server 202 may include a processing unit 240 that executes software 242. The processing unit 240 may be in communication with a memory 244, I/O unit 246, and storage unit 248. The storage unit 248 may store data repositories 250a-250n (collectively 250). The data repositories 250, which may be databases, as understood in the art, may be configured to store information associated with products and customers. The product information may include coupons, recipes, safety information, suggested uses, or any other information that a product manufacturer or the retailer may desire to provide the customers. Information associated with customers may include a mobile identifier or telephone number that is associated with the mobile device that the customer uses, age, gender, or any other demographic information about the customer that the retailer may use to determine what data to provide information to the customer during checkout. "During checkout" may include a time period prior to products being scanned, while products are being scanned, or after the products have been scanned. The software 242 may be configured to receive information from the POS 102 that is collected from the mobile device 108 and generate data 229 for distribution to the mobile device 108 via the network 204, POS 102, and scanner 104. The data 229 may include an image of a barcode or coupon ID for a coupon to be used later by the customer, product information associated with products that the customer is purchasing, or other information that may or may not be associated with the instant transaction being performed by the customer at the POS 102.

Figure 3:
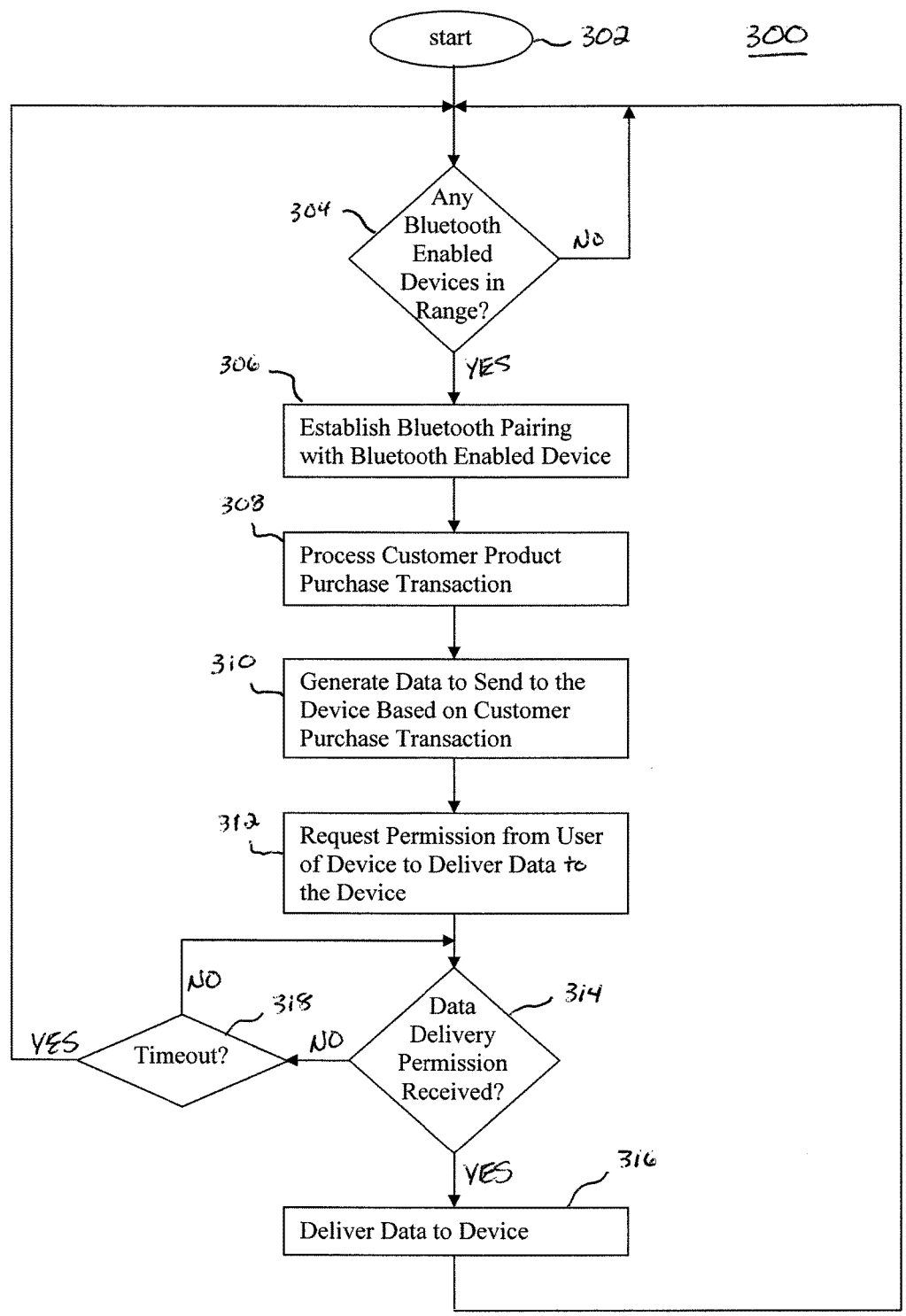
FIG. 3 is a flow diagram of an illustrative process for a POS to interact with and communicate data to a wireless device of a customer.

With regard to FIG. 3, an illustrative process through which a POS communicates with a mobile device is shown. The process 300 starts at step 302. At step 304, a determination may be made as to whether any Bluetooth® enabled devices are in range of a POS. In terms of being in range of a POS, the determination may be made as to whether a Bluetooth® communications protocol or other short range wireless communications protocol can communicate with a mobile device having the same communications protocol, such as a Bluetooth® communications protocol. If the determination is that no Bluetooth® enabled devices are in range, then the process returns to step 304. Alternatively, if a Bluetooth® enabled device is within range of a POS, then at step 306, a Bluetooth® pairing with the Bluetooth® enabled device may be established. In one embodiment, to initiate the pairing, the customer may physically interact with a display of the POS, including a touch screen or non-touch screen display to actively cause the POS to initiate a pairing with the mobile device. Alternatively, the pairing may automatically be initiated by the POS with the mobile device. If multiple mobile devices are within range of the POS, the mobile device that has the highest signal power being received by the POS may be determined to be the correct mobile device with which to communicate. Alternatively, telephone number of the mobile devices in communication with the POS may be presented to the cashier or customer to be shown identifiers (e.g., telephone number, name or customer ID associated with the telephone number) and select one as the correct one with which to communicate. In performing the pairing or communication between the POS or Bluetooth® enabled device (e.g., scanner) at the POS, a request and acknowledgement may be communicated and received by the scanner with the mobile device. At step 308, a customer product purchase transaction may be processed by the POS. In processing the product purchase transaction, the POS may use a scanner at the POS to record products being purchased by the customer.

In processing the product purchase transaction, the POS may access information stored at the POS or request information from a remote server about products being purchased by the customer. At step 310, data for sending to the device based on the customer purchase transaction may be generated. The data may include a coupon including a barcode, warning information, instruction information, or any other information that may be created by a product manufacturer or retailer that may be helpful to the customer. At step 312, permission may be requested from the user of the device (i.e., the customer) to deliver the data via the device. The request may cause an application being executed on the device to prompt the user to accept or reject the data that the POS desires to communicate to the device. At step 314, a determination may be made as to whether data delivery permission has been received. If so, then the process continues at step 316, where the data is delivered to the device. The process thereafter returns to step 304. If the determination at step 314 is negative (i.e., "no"), then the process continues at step 318, where a determination is made as to whether a timeout condition is reached. If a timeout is not yet reached, then the process returns to step 314. Otherwise, the process determines that the customer does not want to receive the data and returns to step 304.

Figure 4A:
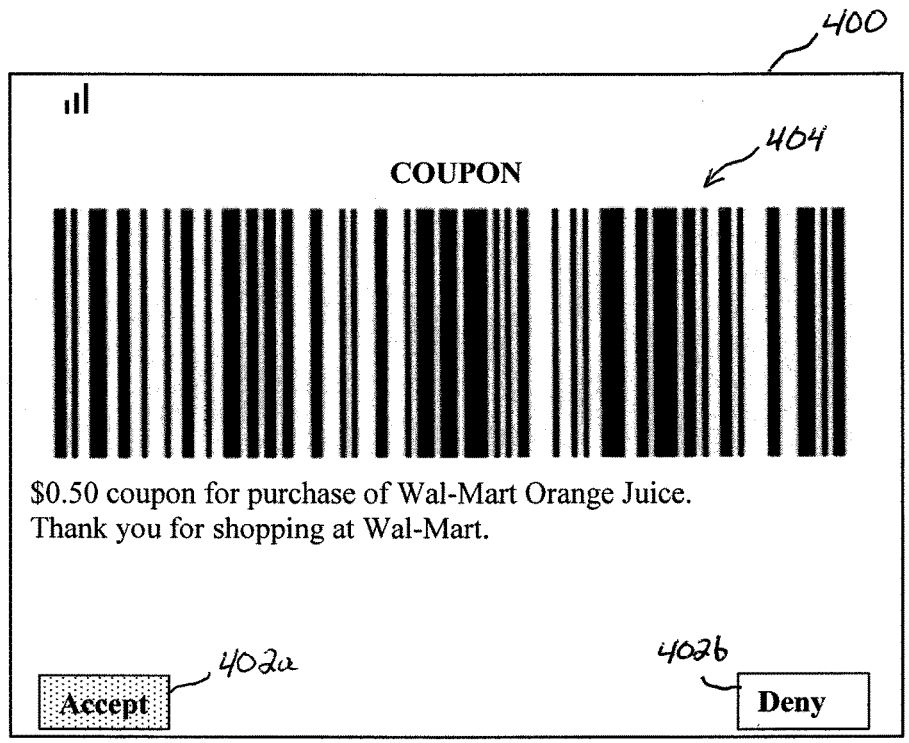
FIGS. 4A and 4B are illustrations of an illustrative electronic display of a wireless device that shows data, such as a coupon and receipt, respectively, that has been communicated to the wireless device from the POS.

With regard to FIG. 4A, an illustrative electronic display 400 is shown. The electronic display may be configured to display information being executed by the mobile device. As shown, accept and deny soft-buttons 402a and 402b are displayed that enable the user to accept or reject data being communicated by a POS to the mobile device. In this case, the user has accepted the data to be communicated to the mobile device. The data, in this case, is a coupon 404 that includes a barcode and text (e.g., "$0.50 coupon for purchase of Wal-Mart orange juice"). The barcode may enable the customer to display the barcode on the electronic display 400 the next time he or she visits Wal-Mart to receive a $0.50 rebate or discount when purchasing Wal-Mart orange juice to allow the barcode to be scanned by a scanner at a POS.

Figure 4B:
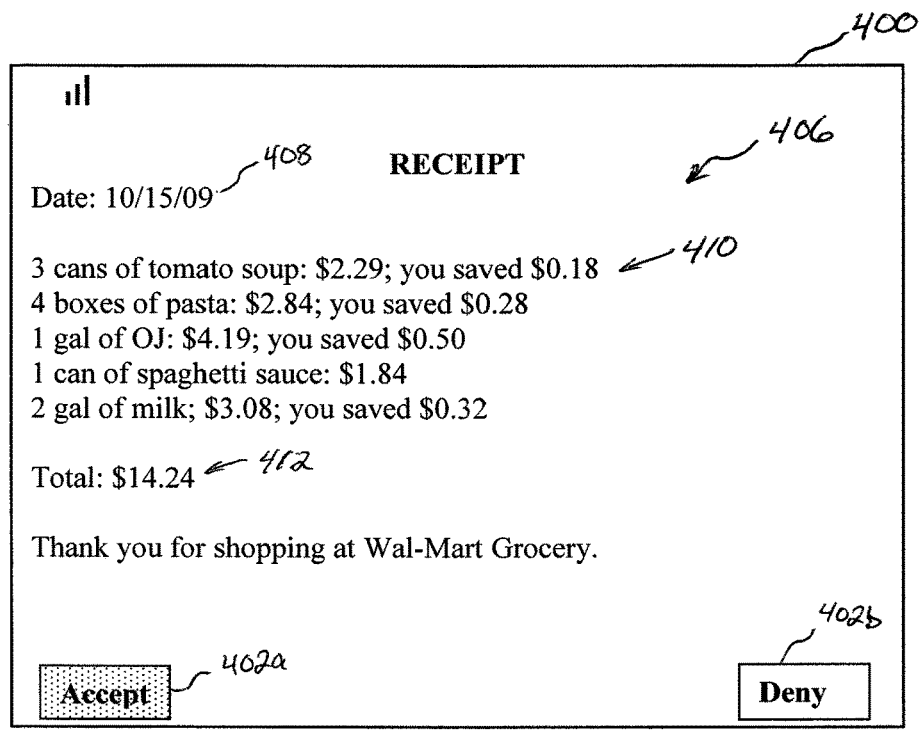

With regard to FIG. 4B, the electronic display 400 shows a receipt 406 that includes a date 408, itemized list of products with associated costs and savings 410, and total bill 412. By providing the customer with an electronic receipt 406, time and money is saved in that the receipt need not be printed on paper and the customer can store the receipt on his or her mobile device for later review and use in the case of returning an item to the retailer.

Figure 5:
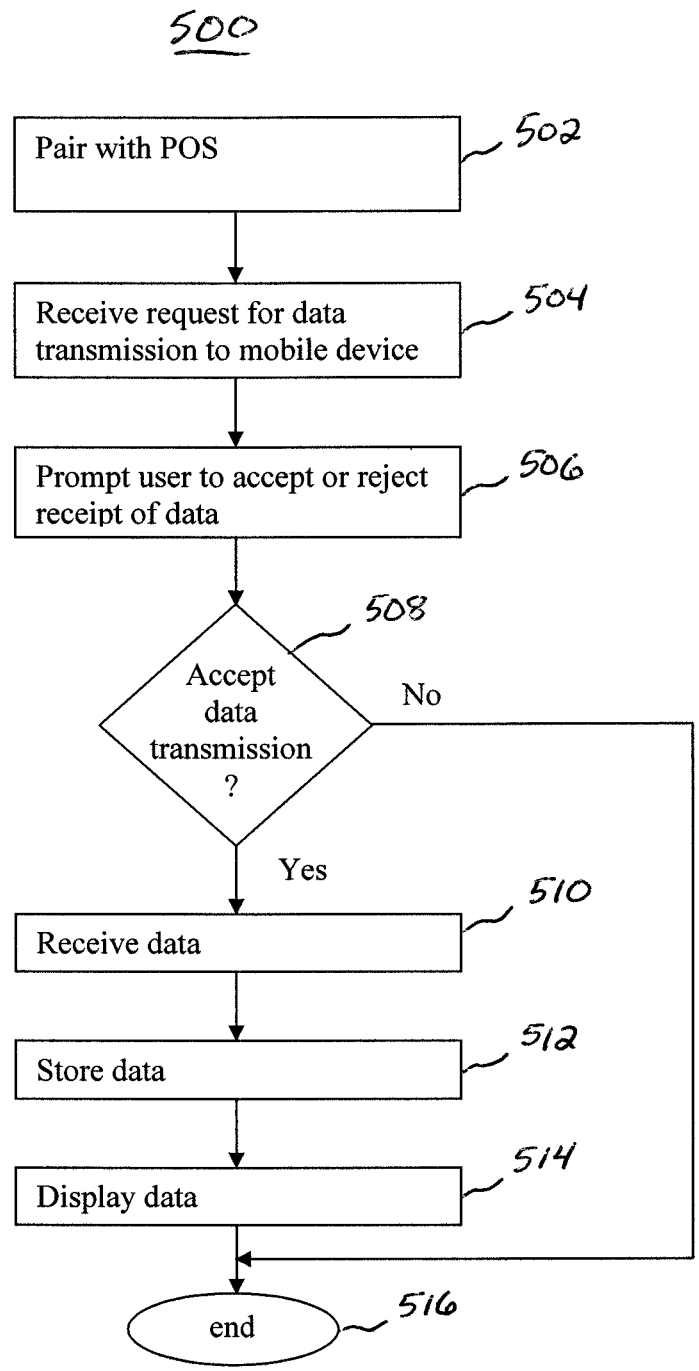
FIG. 5 is a flow diagram of an illustrative process for a mobile device to pair with and receive data from a POS.

With regard to FIG. 5, an illustrative process for a mobile device to be paired with and receive data from a POS is provided. The process 500 starts at step 502, where the mobile device is paired with the POS. At step 504, a request for data transmission to the mobile device is received. In response to receiving the request, the user may be prompted to accept or reject receipt of data at step 506. Alternatively, if the user selects a default of always accept data, then the user may not be prompted to accept or reject receipt of the data. If operating in either the active allowance mode or default mode, the user or customer may initiate the data communication by actively selecting a communication request via a user interface (e.g., soft-button on a touch screen display of the POS). If multiple mobile devices are within range of the POS, then the user may be shown identifiers (e.g., telephone number, name or customer ID associated with the telephone number) and select the one that is his or hers.

At step 508, a determination may be made as to whether the data transmission is to be accepted by the user. If the customer accepts the data transmission, then the process continues at step 510, where data is received. As previously described, the data may include any data associated with the products being purchased, such as coupons, recipes, consumer safety warnings, instructions, etc., electronic receipt, store announcements, promotions, advertisements, or any other data. At step 512, the data is stored, and at step 514, the data is displayed for the customer to view. The process ends at step 516. If, at step 508, the customer does not accept receipt of the data, then the process ends at step 516.

Although the description provides for communications between the POS and mobile device of a customer via a short range or local communications protocol, such as the Bluetooth® communications protocol, it should be understood that the principles of the present invention may provide for other communications protocols to be utilized, including Wi-Fi communications protocol, short message service (SMS) communications protocol, email communications protocol, or other non-short range communications protocol. To assure that good customer relations are maintained, prior to communicating with the mobile device of the customer, the customer is to provide the retailer with an allowance to communicate the data to the mobile device either via the mobile device or at the POS in another manner (e.g., via a customer user interface).

The applet may allow the customer to access the data after being stored in the mobile device. In one embodiment, the data may be stored in the same or similar manner as email or text messages. Alternatively, the applet may store the data according to data type (e.g., recipes, receipts, warning information, coupons, general information, promotion information, advertisement information, etc.), whereby the user may be able to select data type and then view a list of data that has been received based on date received, product name, product type, and so on. The list may be provided in any format, including displaying graphical images of products of which the data is associated. In addition, the applet may provide for searching capabilities for data that has been received from the POS. TABLE I shows an illustrative list of data that has been communicated from the POS to the mobile device. As shown, coupons, warnings, or any other information may be stored and listed on the mobile device.

TABLE I

EXAMPLES OF DATA MANAGED BY MOBILE DEVICE

| Date Rec. | Time Rec. | Name | Type | Information | Expiration | Date Used |
|---|---|---|---|---|---|---|
| Oct. 8, 2009 | 5:37 pm | Soap | Coupon | $0.50* | Nov. 8, 2009 | — |
| Oct. 8, 2009 | 5:37 pm | Soft Drink | Coupon | 3 for $2.00* | Nov. 1, 2009 | Oct. 10, 2009 |
| Oct. 10, 2009 | 3:54 pm | Aspirin | Warning | Overdose limits for children . . . | n/a | n/a |
| Oct. 10, 2009 | 3:54 pm | Paper Towels | Coupon | $0.25* | Dec. 1, 2009 | — |

*indicates barcode attachment available for display

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for providing customers of a retailer with information during checkout, said system comprising:
    a server configured to store and communicate data via a communications network the data including information unrelated to performing a transaction of goods being sold by the retailer;
    a point-of-sale (POS) system at which the customers of the retailer purchase products, said POS system being in communication with said server via the communications network;

a wireless access point in communication with said POS system and configured to operate as an access point for mobile devices associated with the customers to communicate with said POS system, said wireless access point being configured to: (i) detect which of the mobile devices that has the highest signal power, (ii) attempt to pair with a detected one of the mobile devices (iii) subsequently and separately request permission to communicate with the detected one of the mobile devices after pairing with the detected one of the mobile devices, (iv) detect a mobile identifier associated with the detected one of the mobile devices (v) retrieve a profile of a user of the detected one of the mobile devices; (vi) retrieve data based on the profile of the user (vii) prior to communicating the data to the detected one of the mobile devices, to receive permission from the customer via the detected one of the mobile devices in response to requesting permission to allow for the data to be communicated to the detected one of the mobile devices from the POS system, said POS system further configured to receive the data from said server and communicate the data to the detected one of the mobile devices via said wireless access point;

an application being executed on the detected one of the mobile devices and communicating with the POS system, the application configured to: (i) receive the data from the POS system, (ii) determine the data type of data received from the POS system (iii) store the data in a memory of the detected one of the mobile devices based on data type (iv) distinguish the data received from the POS system from data received from other data sources in the memory of the detected one of the mobile devices (v) receive a request for a search (vi) execute a search in the data received from the POS system; and wherein, the wireless access point is configured to restrict receipt of data other than the permission received, from the detected one of the mobile devices.

2. The system according to claim 1, wherein said wireless access point is a barcode scanner.

3. The system according to claim 2, wherein said wireless access point uses Bluetooth® communications protocol for communicating with the detected one of mobile device and POS system.

4. The system according to claim 1, wherein said POS system is further configured to not accept data other than data acceptance acknowledgement data from the detected one of mobile device.

5. The system according to claim 1, wherein the data includes a barcode representative of a coupon, and wherein said wireless access point is further configured to scan the barcode from a display of the detected one of mobile device.

6. The system according to claim 1, further comprising a user interface at the POS system that enables the customer to initiate a communication to the detected one of mobile device.

7. The system according to claim 1, wherein said POS system is further configured to broadcast information to any mobile device within wireless range of the POS system while the POS is not performing a checkout operation.

8. A method for providing a customers of a retailer with information, said method comprising:

detecting, via a wireless access point in communication, mobile devices in proximity to the wireless access point, the wireless access point being configured to communicate with a point-of-sale (POS) system and to select a detected one of the mobile devices that has the highest signal power;

attempting to pair with the detected one of the mobile devices, associated with a customer, with the wireless access point in communication with a POS system;

detecting a mobile identifier associated with the detected one of the mobile devices;

retrieving a profile of a user of the detected one of the mobile devices;

retrieving data based on the profile of the user;

prior to communicating the data to the detected one of the mobile devices and after pairing with the detected one of the mobile devices, transmitting, from the POS system to the detected one of the mobile devices, a request for permission to transmit the data to the detected one of the mobile devices via the wireless access point;

receiving permission from the customer via the detected one of the mobile devices to allow for the data to be transmitted to the detected one of the mobile devices;

transmitting the data from the POS system to the detected one of the mobile devices of the customer via the wireless access point, the data including information unrelated to performing a transaction of goods being sold by the retailer;

receiving, via an application being executed on the detected one of the mobile devices and communicating with the POS system, the data from the POS system;

determining, via the application, the data type of data received from the POS system;

storing, via the application, the data in a memory of the detected one of the mobile devices based on data type;

distinguishing, via the application, the data received from the POS system from data received from other data sources in the memory of the detected one of the mobile devices;

receiving, via the application, a request for a search;

executing, via the application, a search in the data received from the POS system; and wherein, the wireless access point restricts data other than the permission received, transmitted by the mobile device from being received by the POS system.

9. The method according to claim 8, wherein pairing with the detected one of the mobile devices is performed by a barcode scanner.

10. The method according to claim 9, wherein the pairing is performed by the Bluetooth® communications protocol for communicating with detected one of the mobile devices.

11. The method according to claim 8, further comprising communicating the data received from a system other than the POS system to the detected one of the mobile devices.

12. The method according to claim 8, wherein the POS system is configured to not accept data other than data acceptance acknowledgement data from the detected one of the mobile devices.

13. The method according to claim 8, wherein communicating the data includes communicating data of a barcode representative of a coupon, and further comprising scanning the barcode from a display of the detected one of the mobile devices.

14. The method according to claim 8, further comprising initiating pairing with the detected one of the mobile devices in response to the customer initiating pairing by physically selecting to do so via a user interface in communication with and of the POS.

15. The method according to claim 8, further comprising broadcasting information to mobile devices within wireless range of the POS while the POS is not performing a checkout for the customer.

16. A system for wirelessly communicating with a mobile device, said system comprising:
- a server configured to store and communicate data via a communications network the data including information unrelated to performing a transaction of goods being sold by the retailer;
- a computing system at which the customers of the retailer purchase products, the computing system being in communication with said server via the communications network;
- a barcode scanner in communication with the computing system, the barcode scanner being configured to: (i) optically scan barcodes, (ii) decode and communicate identifiers encoded in the barcodes to the computing system, (iii) detect at least one mobile device of the plurality of mobile devices that has the highest signal power, within a predetermined distance of the barcode scanner, (ii) attempt to pair with the at least one of the mobile devices (iii) subsequently and separately request permission to communicate with the at least one of the mobile devices after pairing with the at least one of the mobile devices, (iv) retrieve the data based on the identifiers from the barcode, (v) prior to communicating the data to the at least one of the mobile devices, to receive permission from the customer via the at least one of the mobile devices in response to requesting permission to allow for the data to be communicated to the at least one of the mobile devices from the computing system, the computing system further configured to receive the data from said server and communicate the data to the detected one of the mobile devices via from the barcode scanner;
- an application being executed on the detected one of the mobile devices and communicating with the computing system, the application configured to: (i) receive the data from the computing system, (ii) determine the data type of data received from the computing system (iii) store the data in a memory of the detected one of the mobile devices based on data type (iv) distinguish the data received from the computing system from data received from other data sources in the memory of the detected one of the mobile devices (v) receive a request for a search (vi) execute a search in the data received from the POS system; and
- wherein, the barcode scanner is configured to restrict receipt of data other than the permission received, from the detected one of the mobile devices from being received by the computing system.

\* \* \* \* \*